(12) United States Patent
Avis

(10) Patent No.: US 6,591,715 B2
(45) Date of Patent: Jul. 15, 2003

(54) END MILL TYPE GEAR CUTTERS FOR SPINDLE DRIVEN MACHINES

(76) Inventor: Paul R. Avis, P.O. Box 635, Trinidad, CO (US) 81082

( * ) Notice: Subject to any disclaimer, the term of this patent is extended or adjusted under 35 U.S.C. 154(b) by 0 days.

(21) Appl. No.: 09/749,943

(22) Filed: Dec. 29, 2000

(65) Prior Publication Data

US 2002/0083796 A1 Jul. 4, 2002

(51) Int. Cl.[7] .................................................. B21K 5/00
(52) U.S. Cl. ........................................ 76/115; 76/104.1
(58) Field of Search .............................. 76/115, 104.1

(56) References Cited

U.S. PATENT DOCUMENTS 1,431,402 A * 10/1922 Irwin ........................... 76/115
1,545,719 A * 7/1925 Wildhaber .................... 76/115

* cited by examiner

Primary Examiner—Douglas D. Watts
(74) Attorney, Agent, or Firm—John P. Halvonik

(57) ABSTRACT

A process for producing quick and inexpensive gear cutters made of steel or carbide. Cylindrical shaped blanks of tool steel or other suitable materials of are chosen for a size appropriate for the task and are then machined in order to form cutting edges for a spindle driven tool. The parameters of the cutting edge are chosen by a process that calculates the parameters of the gear that is to be cut with the cutter. The finished product is a gear cutter is an end mill format type of tool having a shank for being driven in a spindle type of machine.

2 Claims, 2 Drawing Sheets

END MILL TYPE GEAR CUTTERS FOR SPINDLE DRIVEN MACHINES

FIELD AND BACKGROUND OF THE INVENTION

The invention relates to the field of cutting tools and in particular to a process for manufacturing gear and spline cutters that can be made quickly and inexpensively from metal stock that is on hand. Or mass produced using conventional processes and materials.

In normal practice gear cutters are made rather expensively as a cutting tool to be used in a horizontal arbor type milling machine that rotates the tool. Such cutters have their uses as they are long lasting and of fairly high quality. One drawback of such tools is that because they are time consuming and expensive to produce and, hence, a company that markets such cutting tools cannot expect to wait for an order to come in and then custom order the cutter for that size of gear. Rather, an entire stock of such cutters must be kept on hand.

The idea of the present invention is to avoid the need to keep and maintain a supply of expensive cutters in stock but rather to disclose a less expensive process for making such gear cutters when they are needed. The manufacturer of such gear cutters will be capable of producing the cutters so inexpensively that even small companies or companies which only use such cutters on a limited basis could afford to keep a broad range of sizes of them on hand.

The applicant's manufacturing process can cut the cost of producing such gear cutters to about ⅓ that of state of the art arbor type gear cutters; given the approximate demands of supply and demand in the present day and age.

SUMMARY OF THE INVENTION

The invention is a process for producing quick and inexpensive gear cutters made of steel or carbide that are made for the gear type that is to be produced by the cutters. Cylindrical shaped blanks of tool steel or other suitable materials of are chosen for a size appropriate for the task and are then machined in order to remove portions in order to form cutting edges for a spindle driven tool having a shank at one end and series of cutting edges at the other. The series of cutting edges should come to a tip opposite that of the shank which, at the tip, are of a suitable geometry to allow the tool to cut at its center.

The parameters of the cutting edge are chosen by a process that calculates the parameters of the gear that is to be cut with the cutter, and then a proper profile for the blades of the cutter is determined. Computers may assist in directing the movements of the machine that does the cutting of flutes which form the cutting edges. Further finishing steps, such as hardening and tempering and adding a flat to the shank of the cutter to facilitate driving the cutter in the machine spindle then complete the manufacturing process.

The finished product is a gear cutter in an end mill format type of tool having a shank for being driven in a spindle type of machine. Such cutters are used to machine gear teeth and splines as required on machinery parts and components.

Such gear cutters can be turned out in this manner in a fast and cost effective manner so that suppliers who need certain types of gears cut can have their orders filled by manufacturers who do not have to have stock an entire set of gear cutters of different sizes. Instead, a firm that needs an order of a gears of a certain size can simply and in a request based on the size of the gears to be cut and an appropriate cutter can be quickly produced with at a cost ⅓ or less that of conventional gear cutters.

It is purpose of the invention to produce spindle driven gear cutters that can be made faster and cheaper than conventional arbor driven gear cutters and allow for the custom production of such gears on an affordable basis instead of having to stock expensive arbor-driven gear cutters.

Another advantage is to produce gear cutters that can be used in spindle driven machines that in turn allows for faster and easier cutting of gears, since the use of spindle driven tools allows for easier and faster centering of the cutting tool vis a vis the gear blank.

Another advantage is that gear cutters can be cut out cylindrical blanks and thus use less material (such as tool steel, carbide etc.) in the production process.

Other objectives will be understood by those skilled in the art once the invention is shown and described.

DESCRIPTION OF THE PREFERRED EMBODIMENT

There are several parameters of a finished gear that need to be first determined in order to cut the proper profile for the cutting edge of a finished gear cutter. Gears of course, have a set of teeth of certain size and mounted upon a wheel or similar shape that is all of a certain size including its diameter. In order to design a gear cutter it is first necessary to measure the following parameters of the finished gear: the diametral pitch; the whole depth of a tooth; the pressure angle of the gears and the number of teeth in the gear.

The diametral pitch is determined by several parameters, viz; the number of teeth and the outside diameter of the gear. The Whole depth of a tooth is determined by several parameters of the tooth, viz.: the addendum, the dedendum and the clearance of the tooth. The pressure angle has to do with the degree of contact between the gear teeth.

Once these values are measured for a desired finished product (i.e. of a finished gear that is to be cut with the gear cutter) formulas are used to calculate the desired profile of the cutting edges on the cutter. These formulas can be worked by hand but computers are increasingly being used to fulfill this task.

Such parameters that are input into the computer suggest a cutting tool having a particular three dimensional shape that will cut a gear of the desired shape. Such three dimensional shape is calculated and these calculations are in turn used to drive the initial cutting of the flutes in the cylindrical blank in order to define the profile or edges of the cutting blades.

Again this process can be automated since a milling or griding machine tool will be used to make the initial cutting of the flute the movements of this machine can be controlled by a computer that has the necessary parameters of the finished 3 dimensional blade shape and the computer program can then manipulate the cutting blade accordingly.

The blade shape is chosen so that gears may be cut cast iron out of blanks of various materials suitable (steel, etc. or even plastic in certain applications) when using this gear cutter. (Note: these blanks are the precursors for the gears themselve and are distinct from those cylindrical blanks that are precursors for the gear cutters. Both blanks may be of cylindrical shape; the gear cutter blanks preferably so.)

Figure 1:
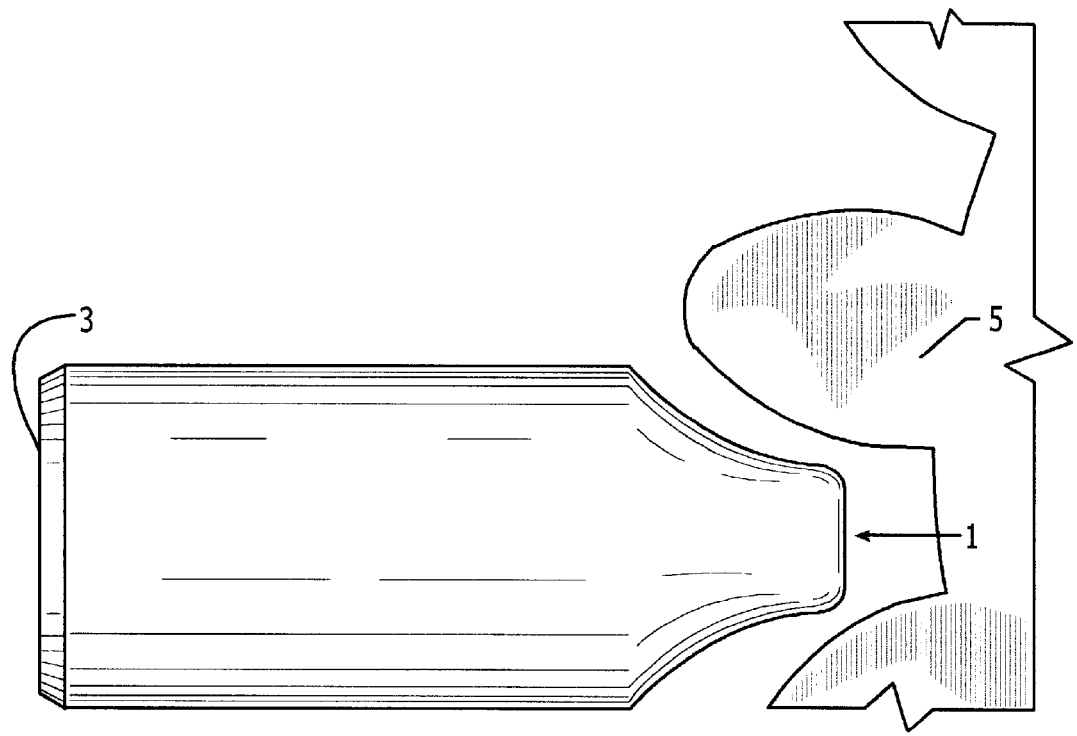
FIG. 1 shows the initial step of turning or grinding the blank into suitable geometry.

The finished gear cutter will be a vertically oriented type of tool with an axis of rotation that is co-existent with the center line 1 of the cylindrical shape that was the original blank for the finished gear cutter. See FIG. 1. The cutting edges are on the periphery of the cylindrical shape. The cutting edge may be made in a helical configuration depending on the type of gear material that is to be cut.

The above description of a vertically oriented gear cutter may be said to be prototypical of a tool used in a milling type of machine. That is the gear cutter of the present invention has a shank defining a cylindrical shape and cutting edges at the forward end of the shank and the cutting edges extend around the periphery of the walls formed by the cylinder as they would be if they were extended out into space from the shank.

Figure 4:
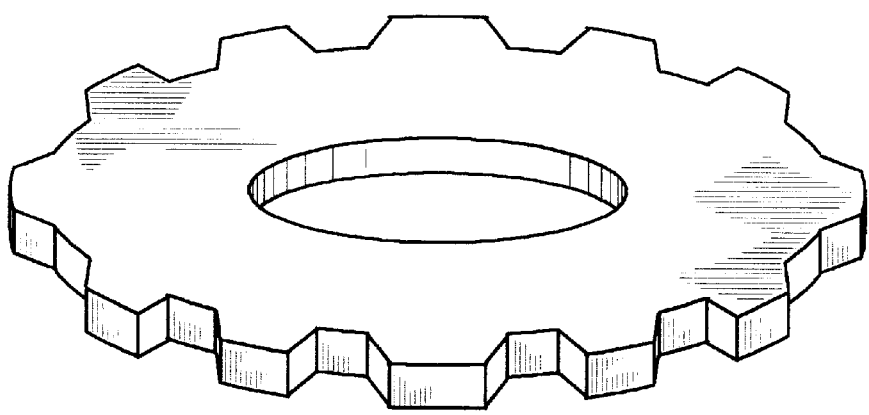
FIG. 4 arbor drive type of gear cutter is shown for comparison purposes with the invention.

The difference between this type of tool and the arbor driven tool is of some importance. Arbor driven gear cutting tools, e.g. arbor driven tools in general, have an opening in the center of the cutting tool so that the tool may be placed upon an arbor that then supplies the rotational motion for the cutting tool. In such case, a portion of these blades must necessarily be held between the confines of the arbor type machine since the driving force of the machine operates upon the center of the cutter and plane of the blades circumnavigates this axis. FIG. 4 illustrates the typical shape of an arbor driven cutting tool.

In the case of spindle driven tools, such motion is supplied by motion applied along the shank of the tool so that the cutting edges of this tool all project downward from the machine driving the cutter along the axis. Such edges are basically an extension of the shank and hence they are at all times below the machine and they are cutting in a cylindrical path that is co linear with the axis of rotation of the shaft.

These type of spindle driven cutting tools are more easier to align with the gear blank. The arbor driven cutting tool presents a cutting edge that presents an edge extending from the machine and this must be aligned by hand or by cumbersome means to align the cutting edge with the proper areas of the gear blank to be cut.

The applicant's type of gear cutter with a shank and series of edges thus projects downward so that the gear blank to be cut can be aligned beneath the center line of the cutter (i.e. through the mid line of the cylindrical shape) for an alignment that can be more accurate and moreover, is much easier to align (either visually or with the help of equipment) since the target for the cutter, is that area between the proposed teeth of the gear that is to be removed from the gear blank.

Gear teeth are cut out of the blank by removing a portion of the metal area so as to form the "teeth" of the gear. A cutting tool that is driven by spindle must then aim its center for the center of the area of the gear blank that is to be removed to insure the proper shape of metal is cut to leave a gear tooth.

The central axis of the cutting tool is concentric with the cutting edges and it is this center that must be aligned with the center of the area of the gear blank that is to be removed. It is much easier to align such centers upon one another in a spindle type of cutting tool like the applicant's than the more common arbor driven type of gear cutters. Thus cutting time is decreased, accuracy is improved through the center alignment technique and tooling costs are reduced.

Returning now to the process for cutting the blades of the gear cutter:

After the parameters for the cutting blade have been calculated, a starting blank of high speed tool steel (or carbide or other hard material) is chosen. This blank is essentially a cylindrical piece of steel (or other piece of hard material such as carbide) that will be put into a grinding or milling tool and then have flutes cut into the cylinder that are in the profile of the desired cutting blades. The flutes should correspond to the geometry of the teeth of the gear that is to be cut. 5 represents the outline of a gear tooth that is to be cut by the gear cutter after the gear cutter is made. The rear edges of the cylinder may be suitable ground to form a chamfer in order to fit into the driving tool. See FIG. 1.

The parts of the cylinder that remain after the flutes are cut are the cutting blades. They may vary in number with 2, 4, 6, or 8 flutes often being preferred. These series of flutes will need to come together in a tip at that end of the cutter that is opposite the shank end. This cutting step is a rough step which will typically leave the blank 0.030" oversize in comparison to the finished product.

The cutting edges of the gear cutter will thus be in the outside walls of a cylindrical shape that represents the original metal blank used for the process. The shape of the blank now having one end with cutting blades and the rest of the shape forms a shank that has roughly the same cylindrical outlines of the cylindrical metal blank that was the starting material. The finished cutter has its cutting edges on the periphery of the cylindrical form; unlike the conventional arbor driven gear cutters that have the teeth on the edge of a flat blade with an open center. See FIG. 4.

After the lathe or griding tool has formed a rough profile in the gear cutter blank, these profiles need to be compared to overlays of a proper gear tooth to insure that the proper size of the blades has been cut. A comparator machine allows for visual comparison of a prototype gear with blank that has been cut. These can be compared either by human eye or by a machine that can measure the two and determine whether the profile of the blades of the blank is within the tolerances suggested.

Figure 2:
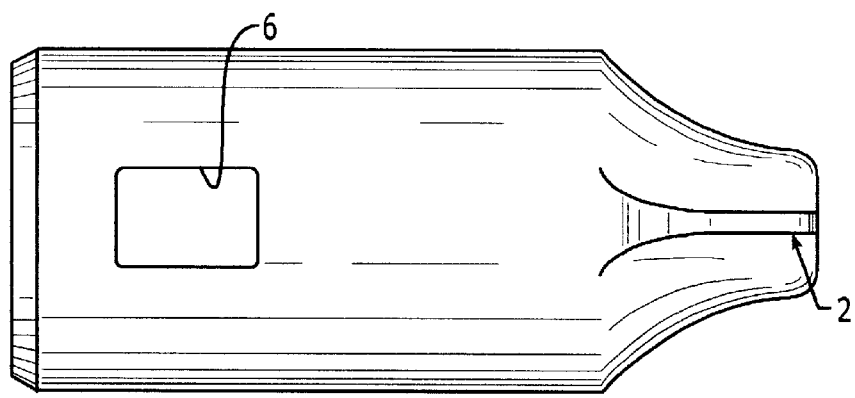
FIG. 2 subsequent step of miling or grinding flutes in the cylndirical blank.

If the tolerances for the blade profiles are acceptable, further steps are done to create the finished product. Flutes 2 may be ground or milled in the cylinder, see FIG. 2. Straight flutes are illustrated here but helical flutes may be also be created without varying from the spirit of the invention. Again the angle of the helical flutes should be chosen to suit the type of gears that are to be cut with the tool.

Figure 3:
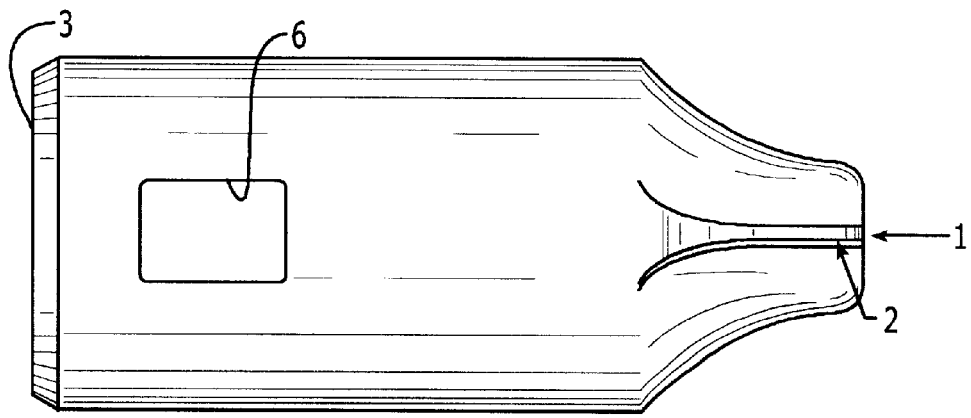
FIG. 3 final steps in the process including grinding secondary and primary relief edges.

The final steps include hardening and tempering the blank in the case of a tool steel blank. See FIG. 3. If a solid carbide is used as the starting blank, this step does not need to be done. It is also possible to have the cutting edges brazed onto the blank, in which case hardening or tempering is not needed. Finally, the cutter is ground to final size and geometery. The face of the cutting edge should be ground exactly to the center line, see FIG. 3. Primary and secondary relief or clearance angles are finish ground at this time as well as the cutting edges being sharpened. Relief angles are the same as a regular end mill to suit the material being matchined. Final inspection of proper geometry and finish size may be made at this time.

A "drive flat" 6 may be made in one or both sides of the gear cutter. this is a portion of the cylindrical shaped shank that has been flattened down in order that the gear cutter can be better fit into the spindle driving machine. The flat allows a set screw or other locking mechanism in the tool holder to be set against the shank of the gear cutter and so hold it in place. The blades may be further sharpened and relieved by conventional machine tools.

Other steps known to those skilled in the art can be practiced as part of the invention. When such a cutter becomes dull it may be sharpened by economically and re-sized using conventional tool and cutter grinding equipment.

I claim:

1. A process for creating gear cutter tools for cutting gears out of gear blanks and to enable the gear cutter tools to be driven by spindle driving type of machine having a means to accommodate a cylindrical shaped shank portion of the gear cutter and to rotate the gear cutter tool about an axis that is parallel to the length of the shank, the process comprising the steps of:

determining the following measurements in a gear that is to be cut out of the gear cutter;

the diametral pitch;

the whole depth of a tooth;

the pressure angle of the gears and the number of teeth in the gear;

determine from said measurements the final size and shape of a gear tooth and from this derive the shape and size of a gear cutter that is to cut the space between said gear teeth;

obtaining a cylindrical shaped blank having two ends and a drive axis running the length of said cylindrical shape and being perpendicular to said ends;

said blank made of materials comprising:
      tool steel or carbide;
      grinding one of said ends of said blank into a geometry that can accommodate the shape of said gear tooth so as to leave the other of said ends uncut and a shank end, grind flutes in said cylindrical blank
      said flutes of shape appropriate for the type of gear that is to be cut by said gear cutter;
      grinding secondary and primary relief angles onto said flutes in order to create cutting edges;
      the further step of machining said shank end so as to form a shape in said shank end so that the spindle driving machine may engage said shank end and rotate said shank about an axis.

2. The process of claim 1 wherein said further step of machining said shank end includes adding a drive flat to said shank end.

* * * * *